May 2, 1961      A. FERRANTI      2,982,164
HYDRAULIC SHEARING MACHINES, PARTICULARLY FOR BARS
Filed Sept. 13, 1956      2 Sheets-Sheet 1
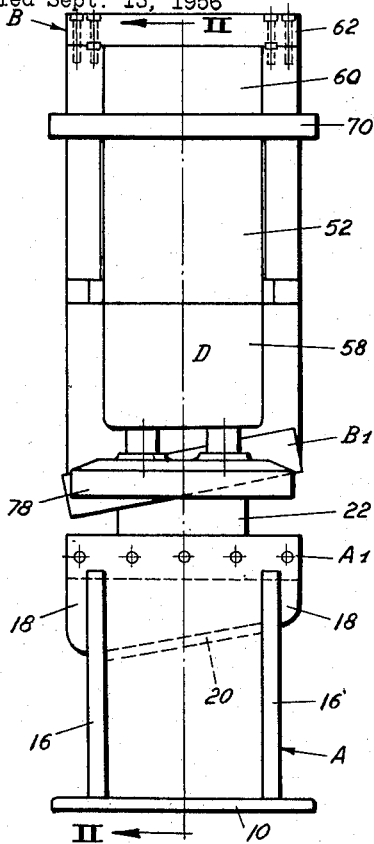
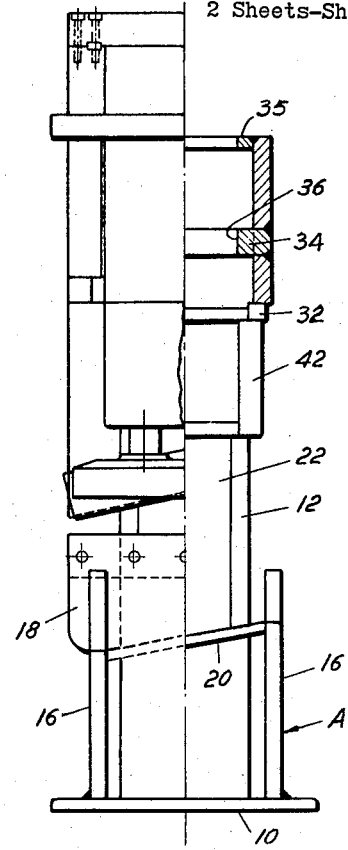
Fig.1      Fig.5
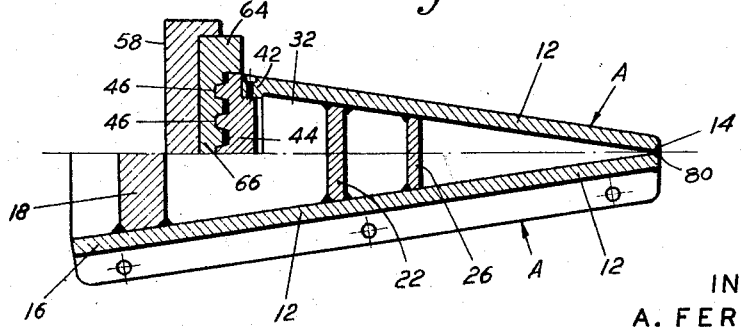
Fig.4
INVENTOR
A. FERRANTI

INVENTOR
A. FERRANTI

United States Patent Office 2,982,164
Patented May 2, 1961

---

2,982,164

HYDRAULIC SHEARING MACHINES, PARTICULARLY FOR BARS

Albino Ferranti, 19–21 Via Belinzaghi, Milan, Italy

Filed Sept. 13, 1956, Ser. No. 609,663

Claims priority, application Italy Sept. 15, 1955

5 Claims. (Cl. 83—635)

The present invention relates to a shearing machine operated hydraulically and suitable for cutting bars, sheets, and various sections of considerable thickness.

The object of the invention is to provide a shearing machine suitable for cutting bars of considerable length or objects of a complicated profile, its construction being suitably designed to achieve these objects and at the same time to be robust and rigid, easily manufactured, and requiring a limited use of materials, both in respect of its performance and in respect of its power, so that noteworthy economic advantages are obtained.

Another object of the invention is to provide operating and control apparatus for the cutter and the pressure members of the shearing machine, so as to ensure correct operation of the latter under any working conditions.

Yet another object is to provide hydraulic shears in which the cyclic operation of the blade and of the pressure members is effected automatically or manually in dependence on the work requirements and by means of simple and rapid movements.

These shears, of the type in which the movable cutter is operated by a cylinder-piston assembly, is characterised in that the movable part of this assembly is connected to the middle part of the cutter and is disposed between the guides of the latter.

According to the invention the movable cutter is associated with support means which are slidable in guides provided on the rear part of said means and on the frame, the section of said guides being trapezoidal so that under the cutting stress the support members will be further engaged with the guide surfaces.

The frame of the shears advantageously has in the horizontal direction a triangular or delta section, the cutting blades being disposed along one of its sides and their length being such that they project beyond at least one of the apices of the triangle, in order thereby to permit the cutting of bars or the like of considerable length, even when the length of the cutters is limited, as is the case in shears for cutting considerable thicknesses.

Figure 2:
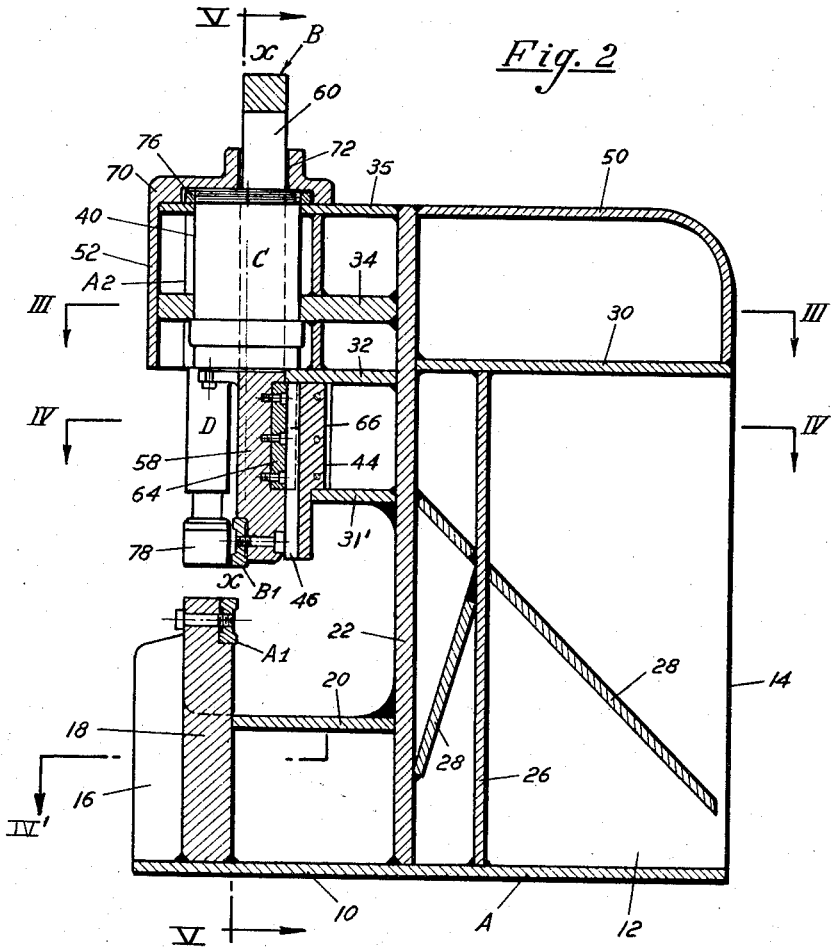
Figure 3:
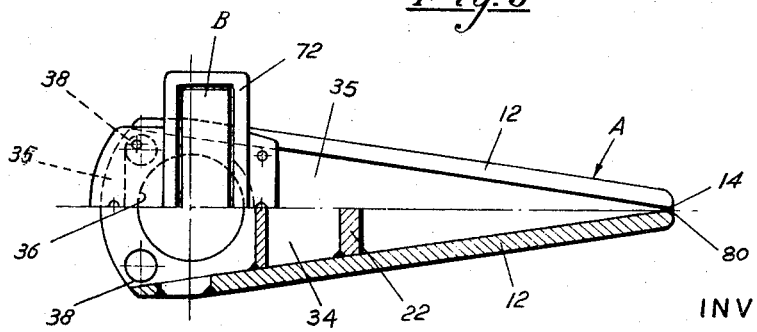

The hydraulic shearing machine of the present invention is completed by operating and control apparatus of the electro-mechanical type, and will now be described in connection with one advantageous embodiment given by way of example, with reference to the accompanying drawings, wherein:

Figure 1 is a front elevation of the shearing machine of the present invention,

Figure 2 is a vertical longitudinal section thereof taken on line II—II of Fig. 1, Fig. 3 is a plan view, partly in section, of the apparatus of Fig. 1, the part in section being taken along line III—III of Fig. 2, Fig. 4 is a plan view of the apparatus of Fig. 1, the upper half of the figure being taken along section line IV—IV of Fig. 2, and the lower half being taken on section line IV—IV' of Fig. 2, and Fig. 5 is a front elevation view, partly in section, the section being taken along section line V—V of Fig. 2.

Referring to these drawings, the characteristic structure of the shearing machine will first be described, the latter being advantageously made of rolled or section steel members and also of cast-iron members, which are connected together by welding.

Referring to Figures 1 to 5, the structure of the shearing machine comprises a frame A, which in suitable manner supports the fixed blade $A_1$ and a slidable frame B which holds the movable blade $B_1$ operated by the cylinder-piston assembly C.

*Construction of the shears*

The frame A has a baseplate 10, on which are fixed two longitudinal uprights 12 formed by two symmetrical plates constituting the sides of the frame. These uprights are fixed to the plate 10 in such a manner as to be inclined symmetrically in relation to the longitudinal axis of the plate, while at their rear vertical edges 14 they meet and are joined together by weld 80. At the front the uprights 12 end in flanges 16 adapted to hold an anvil 18 for the pressure member which will be referred to hereinbelow and which holds the fixed blade $A_1$, which advantageously projects from at least one of the uprights 12. At the rear the block 18 has a cradle 20 which is inclined laterally and which, in addition to connecting together the various elements of the frame A, receives and discharges the objects cut. The cradle 20 is connected at its other end to a cross-upright 22 disposed between the two longitudinal uprights 12 and fixed to the latter and to the base 10.

The parts now seen, that is to say the longitudinal uprights 12 and the cross-upright 22 form a prism in the shape of an isosceles triangle, the base of which is parallel to the cutting edges of the blades $A_1$ and $B_1$. This structure is further stiffened and reinforced by suitable supplementary members, such as one or more auxiliary uprights 26 and brace plates 28, and by an intermediate cover plate 30 opposite the base 10. These elements, particularly the plates 28, are suitably disposed having regard to the stresses occurring during the cutting.

On the outer face of the cross-upright 22 and towards its top are fixed pairs of bushes 32 and 34 suitably spaced apart, the last-mentioned of which is of greater length and has a central aperture 36 (see Figure 3) and two side apertures 38 for the purposes which will be mentioned hereinbelow.

The pairs of brackets 32 and 31, and 35 and 34, in addition to being fixed, for example by welding to the upright 22, are also fixed by their side edges to flanges 42 provided on the front of the two uprights 12. The brackets 32, together with the front edge flanges 42 (Figure 4) of the uprights 12, support a plate 44 the front face of which has vertical ribs 46 having a trapeze-shaped section for the purpose of forming slide guides for the frame B, as will be described hereinbelow.

At the rear and in their upper part the uprights 12 are provided with a cover plate 50 opposite the intermediate plate 30. A shield 52 is fixed at the front to the brackets 34 in order to complete the structure, and its vertical edges are connected and fixed to the ends of the flanges 40 on the uprights 12.

The frame B constituting the movable blade-holder is formed by a baseplate 58 provided with a seat to hold the blade $B_1$ and equipped at its ends with prismatic uprights 60, the latter being connected at their top ends by a removable crosspiece 62. Behind the baseplate 58 is fixed a counter-plate 64, the free face of which is provided with grooving complementary to the ribs 46 provided on the plate 44 and formed by ribs 66 complementary to the grooves delimited by said ribs 46. These mutually engaging ribs form part of the guides for constantly holding the frame B in a plane parallel to its longitudinal plane. The frame B is held guided in the direction parallel to its longitudinal plane by guides formed by the inside faces of the uprights 60 of said frame and by the side faces of the plate 44 fixed to the frame A, the width of which is equal to the distance between said uprights.

The guides for the frame B are then completed by a cover 70 detachably fixed to the top bracket 34. This cover has a rectangular aperture 72, the walls of which cooperate with the three lateral faces of each of the uprights 60, which are thus secured against possible bending.

Because of the special system of guidance for the blade-holder B (frame B), the movable blade $B_1$ is stably held in effective cooperation with the fixed blade $A_1$. In addition, through the provision of the trapeze guides 46 and 66 disposed parallel to the cutting edges of the cutters, it is possible during cutting to effect automatic taking-up of the play between the cutting edges occurring during the cutting, which is also possible because of the inclination of the cutting edge of the movable blade $B_1$ in relation to that of the fixed blade $A_1$, which is perpendicular to the direction of movement of the blade-carrier B. It is also necessary to bear in mind the possibility of neutralising and balancing the stresses applied to the blade-carrier B during the cutting, in relation to the situation of the prismatic guides 44 and 46 provided very near the blades $A_1$ and $B_1$.

The situation of the frame B on the frame A is obvious—that is to say in the opening of the frame B is inserted the group of brackets 32 and 34 with the respective parts which will now be described.

In the aperture 36 provided at the front in the brackets 34 is disposed the cylinder-piston assembly C, the movable part (i.e. the piston) of which is fixed to the base-plate 58 of the frame B, in such a manner that the axis X—X of said cylinder-piston group is practically coincident with the vertical plane containing the cutting edges of the blades $A_1$ and $B_1$. The fixed part of the cylinder-piston assembly C (in this case the cylinder 40) is fixed to the bracket 33 by means of the fastening rings 76 cooperating with the top bracket 35. From the description given it is clear that the compressive stresses applied by the cylinder-piston assembly C to the blade $B_1$ is applied to said blade in the central position and symmetrically, thus enabling shears of a certain power to be produced with a structure A of limited dimensions and with the limited use of materials, as previously stated, without abnormal deformations occurring during the cutting.

In addition, the disposition of the frame A in the form of an isosceles triangle not only considerably reduces dimensions as compared with shears of equal power, but also enables the operator to have better visibility and above all greater freedom of movement, so that he is able to carry out complicated and laborious work accurately and rapidly. It must also be pointed out that this triangular construction easily permits the cutting of bars of any length, with the blades $A_1$ and $B_1$ approximately in the middle position.

In the two holes 38 provided at the front of the brackets 34 are similarly fixed respective cylinder-piston assemblies D, the movable part of which supports at the bottom a prismatic head 78 cooperating with the anvil previously referred to in order to constitute, together with the latter part, the pressure or holding-down member.

As already pointed out, the movable blade $B_1$ is advantageously operated hydraulically by the cylinder-piston assembly C.

What I claim is:

1. A shearing machine comprising a stationary frame having two upright side plates, at least one cross upright joining said side plates, an anvil connected between the lower part of the vertical edges of said side plates, a fixed shearing blade on said anvil, a rectangular frame slidably mounted on the upper part of the unconnected vertical edges of said side plates above said anvil, a moving shearing blade mounted in said rectangular frame and having one side edge opposed to a side edge on said fixed shearing blade, said moving shearing blade having the engaging edge thereof at an angle to the horizontal, a moving support member on said rectangular frame and on which said movable shearing blade is fixed, and a fixed support member mounted between the vertical side edges of stationary frame adjacent said sliding support, the opposed faces of said support members being parallel to the plane including said vertical side edges, one of said support members having vertically disposed trapezoidal ribs on the face thereof opposite to the other support member and the other of said support members having vertically disposed grooves in the face thereof opposite to the one support member, said grooves having a shape complementary to said trapezoidal ribs and in which said trapezoidal ribs are slidably engaged.

2. A shearing machine as claimed in claim 1 and a bracket on said cross upright projecting into the opening formed by the said rectangular frame, and a piston-cylinder assembly being mounted between said bracket and said rectangular frame for driving said moving support members.

3. A shearing machine as claimed in claim 1 in which said moving shearing blade is mounted on said moving support member on the lower end thereof on the side away from the side of said sliding support member engaged with said fixed support member.

4. A shearing machine as claimed in claim 1 in which said moving support has a recess therein of a width the same size as said fixed support member and in which said fixed support member is positioned with said ribs and grooves in engagement.

5. A shearing machine as claimed in claim 1 in which a vertical edge of one side plate is joined to a vertical edge of the other side plate, said anvil and fixed support member being connected between the unconnected vertical edges of said plates and forming the base of a triangle, the sides of which are formed by said side plates, the horizontal dimension of said side plates being equal and the triangle being an isosceles triangle.

References Cited in the file of this patent

UNITED STATES PATENTS

| | | |
|---|---|---|
| 449,525 | Ely | Mar. 31, 1891 |
| 1,058,964 | Gray | Apr. 15, 1913 |
| 1,334,718 | Slick | Mar. 23, 1920 |
| 1,782,362 | McArthur | Nov. 18, 1930 |
| 2,371,411 | Rhodes | Mar. 13, 1945 |
| 2,597,169 | Nowak | May 20, 1952 |
| 2,602,508 | Patrick | July 8, 1952 |
| 2,707,996 | Kalb | May 10, 1955 |

FOREIGN PATENTS

| | | |
|---|---|---|
| 610,257 | Great Britain | Oct. 13, 1948 |
| 1,101,976 | France | Apr. 27, 1955 |